(12) United States Patent  (10) Patent No.: US 7,436,592 B2
Peterson  (45) Date of Patent: Oct. 14, 2008

(54) COMBINATION SCREEN (75) Inventor: Mark David Peterson, Lake Oswego, OR (US)

(73) Assignee: InFocus Corporation, Wilsonville, OR (US)

( * ) Notice: Subject to any disclaimer, the term of this patent is extended or adjusted under 35 U.S.C. 154(b) by 256 days.

(21) Appl. No.: 11/438,922

(22) Filed: May 22, 2006

(65) Prior Publication Data

US 2006/0262394 A1    Nov. 23, 2006

Related U.S. Application Data

(60) Provisional application No. 60/683,230, filed on May 20, 2005.

(51) Int. Cl.
    *G03B 21/56* (2006.01)
(52) U.S. Cl. .................................. 359/443; 359/460
(58) Field of Classification Search ......... 359/454–457, 359/460, 443
    See application file for complete search history.

(56) References Cited

U.S. PATENT DOCUMENTS

| | | | |
|---|---|---|---|
| 4,544,946 A | | 10/1985 | VanBreemen |
| 4,911,529 A | * | 3/1990 | Van De Ven ................. 359/454 |
| 5,513,036 A | | 4/1996 | Watanabe et al. |
| 5,590,943 A | | 1/1997 | Yoshida et al. |
| 6,574,041 B1 | * | 6/2003 | Chen ........................... 359/459 |
| 6,597,502 B2 | * | 7/2003 | Takahashi et al. ............ 359/456 |
| 6,665,118 B2 | | 12/2003 | Yamaguchi et al. |
| 6,710,919 B1 | * | 3/2004 | Clausen ....................... 359/453 |
| 6,804,054 B2 | | 10/2004 | Takahashi |
| 7,349,154 B2 | * | 3/2008 | Aiura et al. .................. 359/449 |

* cited by examiner

*Primary Examiner*—Christopher Mahoney
(74) *Attorney, Agent, or Firm*—Alleman Hall McCoy Russell & Tuttle, LLP (57) ABSTRACT

A combination screen. The combination screen can be configured to provide both light diffusion functionality and light redirection functionality.

26 Claims, 7 Drawing Sheets

COMBINATION SCREEN

CROSS REFERENCE TO RELATED APPLICATIONS

This application claims the benefit of U.S. Provisional Application No. 60/683,230, filed May 20, 2005, the entire contents of which are incorporated by reference.

BACKGROUND

There are many ways of projecting or displaying an image on a display surface. One method of generating a large screen display is the use of a display device, such as a projection device and/or a projection television. Two types of projection televisions are rear projection televisions and front projection televisions. Typically, the components of a rear projection television are contained in a single unit. In contrast, with a front projection television, the components of the television may be separated from each other. For example, in some front projection television systems, some of the components may be disposed in a first location, while other components may be disposed at a second location.

Components of projection televisions typically include a projector and a screen. An image may be generated by the projector and displayed on the screen. The type of projector and/or screen, or combination thereof, may affect the quality of a displayed image.

BRIEF DESCRIPTION OF THE DRAWINGS

The disclosure is illustrated by way of example and not by way of limitation in the figures of the accompanying drawings, in which the like references indicate similar elements and in which.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

A screen for use with a display device is described below. In some embodiments, the combination of a display device and a display screen may be considered a display system. Display device, as used herein, may include any suitable display device configured to display or project an image. Exemplary devices include, but are not limited to, image-generation devices, projection devices, televisions, monitors, etc. As an example, a projection device may be configured to generate an image and project the image to a display screen. As used herein, a projection device may include any suitable display device or image projector, including, but not limited to, a digital projector, a liquid crystal display (LCD) projector, a digital light processing projector, a rear projector, a rear projection television, a front projector, etc.

As an example, a display device may include a light source and an optical system or illumination system. The light source may be adapted to produce a beam of light and project the light towards the optical system. The optical system may be configured to generate an image and project the image to a display screen. The display screen may be configured to reflect the projected image and direct the image toward a viewer. In some embodiments, the screen surface may reflect incoming light so that the projected image is visible to the viewer.

Figure 1:
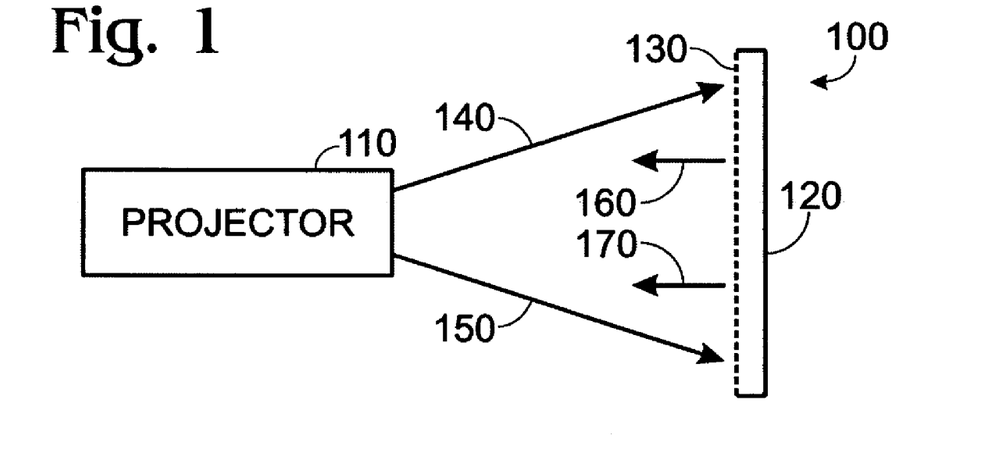
FIG. 1 is a schematic illustration of a front projection display device.

FIG. 1 illustrates an exemplary display device, specifically a front projection display device 100. Front projection display device 100 includes a projector 110 and a screen 120. Screen 120 may be a display surface configured to display an image projected by projector or projection device 110. Typically, screen 120 includes a screen surface 130.

During operation of front projection display 100, projector 110 may be configured to generate an image and project the image on to screen 120. Screen 120 may reflect the projected image and direct it toward a viewer (not shown). In some embodiments, screen surface 130 may scatter light so that the projected image is visible to the viewer. Rays 140 and 150 illustrate exemplary paths that light may travel from projector 110 to screen 120, while rays 160 and 170 illustrate exemplary paths that light may travel after reflecting off of screen 120.

Figure 2:
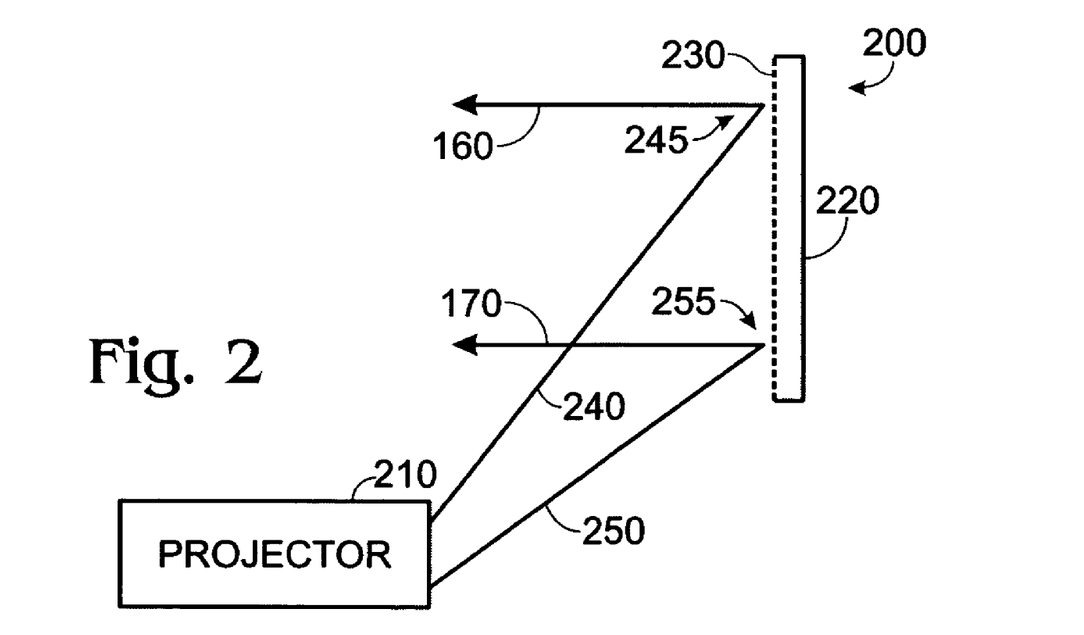
FIG. 2 is another schematic illustration of another front projection display device according to an embodiment of the present disclosure.

FIG. 2 illustrates another exemplary front projection device 200. Projector 210 may be configured to project light at a steep angle from the horizontal to screen 220. For example, projector 210 may be offset from screen 220 such that light is projected onto screen 220 at an angle between approximately 30 to 80 degrees from the horizontal. The angle of reflection may vary along the screen. Rays 240 and 250 illustrate exemplary paths that light may travel from projector 210 to screen 220. For exemplary purposes only, ray 240 is shown reflecting and diffusing off of the screen at an angle 245. Angle 245 may be any suitable angle, such as an 80 degree angle. Similarly, ray 250 is shown reflecting off of the screen at angle 255. Angle 255 may be any suitable angle, for example angle 255 may be a 30 degree angle. As with FIG. 1, rays 160 and 170 illustrate the path that light may travel after reflecting off of screen 220.

Figures 3, 3A:
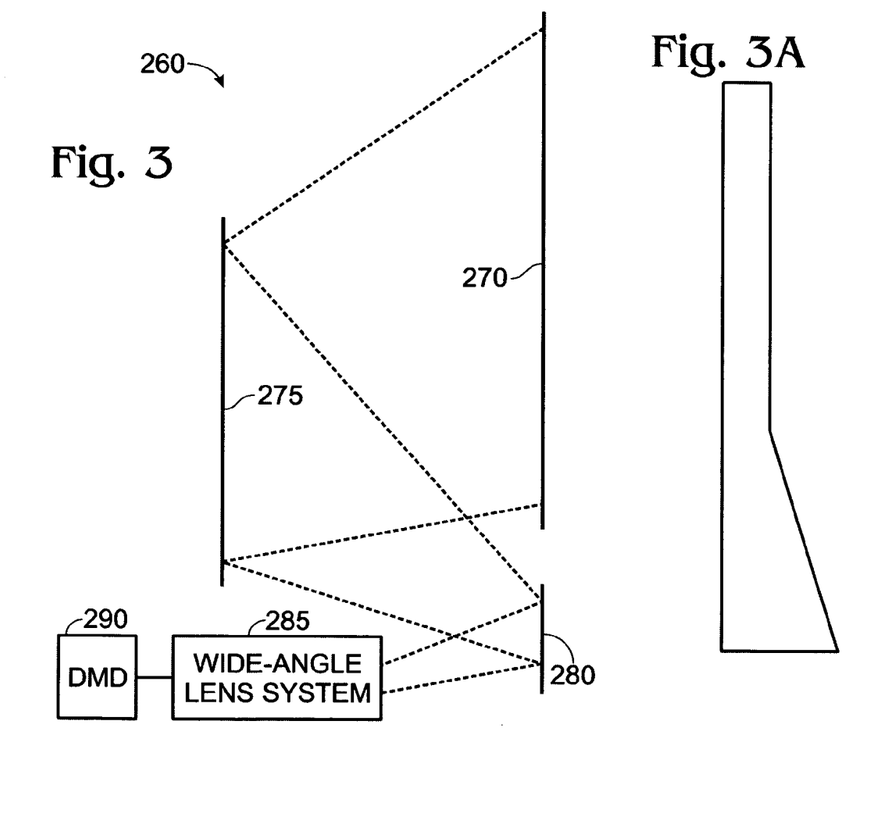
FIG. 3 is a schematic illustration of a rear projection display device.
FIG. 3A schematically illustrates a side view of an exemplary rear projection display device.

FIG. 3 illustrates another exemplary embodiment of a display device, specifically a rear projection display device. FIG.

3 illustrates an embodiment of an ultra-thin rear projection display device with planar mirrors parallel to a screen. Similarly, FIG. 3A provides a side view illustration of a rear projection display. However, it should be appreciated that other configurations for rear projection display devices may be provided without departing from the scope of this disclosure.

In FIG. 3, the exemplary ultra-thin rear projection display device 260 includes screen 270, back plate mirror 275, intermediate mirror 280, lens system 285 and digital micromirror device (DMD) 290. Each of these components and the configuration are provided for exemplary purposes. Other components, for example, image generating components, may be included and may not be illustrated for reasons of simplicity of description. In the example embodiment, an image may be provided to DMD 290 in any suitable manner. DMD 290 may be configured to selectively reflect light from a light source (not shown in FIG. 3) to lens system 285. Other types of devices (e.g., microelectromechanical systems (MEMS), grating light valve (GLV), liquid crystal display (LCD), liquid crystal on silicon (LCOS)) may be used to provide an image to lens system 285. In one embodiment, the mirrors may be substantially parallel to the screen, which implies an alignment error of +/−10°. In one embodiment, the optic axis of the wide-angle lens system may be substantially perpendicular to the screen, which also implies an alignment error of +/−10°.

In one embodiment, DMD 290 may be offset from the optic axis of lens system 285 such that only a portion (e.g., 50%, 60%, 40%) of the available lens field is used. For example, the image from DMD 290 may be projected by lens system 285 in the upper portion of the lens field to intermediate mirror 280, in an embodiment of the invention. The image may then be reflected to back plate mirror 275 and finally to screen 270. In other embodiments, the image from DMD 290 is projected by lens system 285 in the lower portion of the lens field to intermediate mirror 280.

Lens system 285 may be any suitable optical system for projecting the image. As an example, lens system 285 may be a wide angle lens system of over 100 degrees full field. In other embodiments, lens system 285 may be a very wide-angle lens system. However other optical lens systems are possible. In one embodiment, lens system 285 has a field angle of 152° or more; however, other lenses may be used. In general, the wider the angle of lens system 285, the thinner display device 260 can be made. Description of a suitable wide-angle lens system is described in U.S. Pat. No. 7,009,050 entitled Wide Angle Lens System Having a Distorted Intermediate Image, filed Aug. 16, 2002, which is hereby incorporated by reference.

Intermediate mirror 280 may reflect the image to back plate mirror 275, which may reflect the image to screen 270. Screen 270 may be a combination screen including integrated Fresnel lens features and lenticular screen features as described in more detail below.

Figure 4:
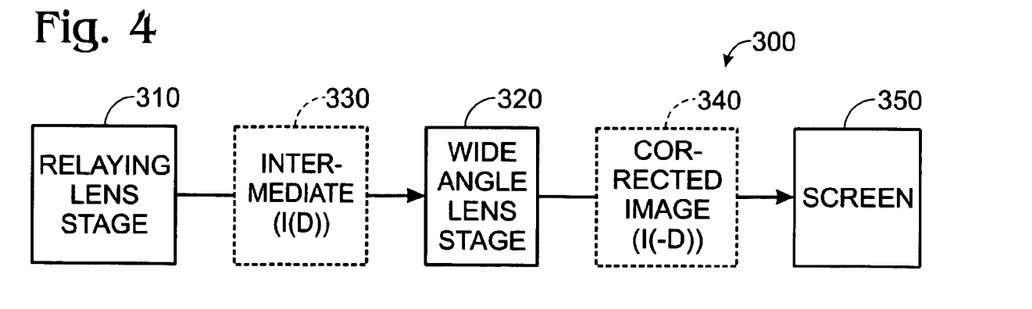
FIG. 4 is a block diagram of a lens system that may be used in the display device illustrated above according to an embodiment of the present disclosure.

In one exemplary wide angle system, illustrated schematically in FIG. 4, a system 300 may include a relay lens stage 310 and a wide angle lens stage 320. Relay lens stage 310 may be configured to generate and project an intermediate image 330 to wide angle lens stage 320. Wide angle lens stage 320 may be configured to generate and project corrected image 340 for display on screen 350.

Intermediate image 330 may be considered a distorted image (I(D)) such that wide angle lens stage 320 receives a predistorted image. The distortion caused by wide angle lens stage 320 is such that substantially all the distortion of intermediate image 330 is compensated for (cancelled) by wide angle lens stage 320 to generate image (I(−D)). The reference (I(−D)) is intended to indicate an image without the distortion of the intermediate image. It should be appreciated that the distortion can be to the image shape and/or the focal plane.

For purposes of the present description, the term "distortion" is intended to mean any change from the initial image inputted into the predistortion system. For example, in some embodiments, a distortion in the image includes an alteration in the shape of at least a portion of the image. The term "predistortion" is intended to mean an intentional distortion of an optical image that compensates for (i.e. is substantially equal and opposite to) distortion generated by the wide-angle projection system. It will be appreciated that the predistorted image may be presented in a variety of different configurations depending on the type of downstream distortion for which the predistorted image is intended to compensate.

The system described in FIG. 4 may include additional optics (not shown). For example, the system may include one or more prisms, etc. to direct the image along a desired light path. Moreover, there may be one or more lenses configured to alter the intermediate image or the corrected image.

Figure 5:
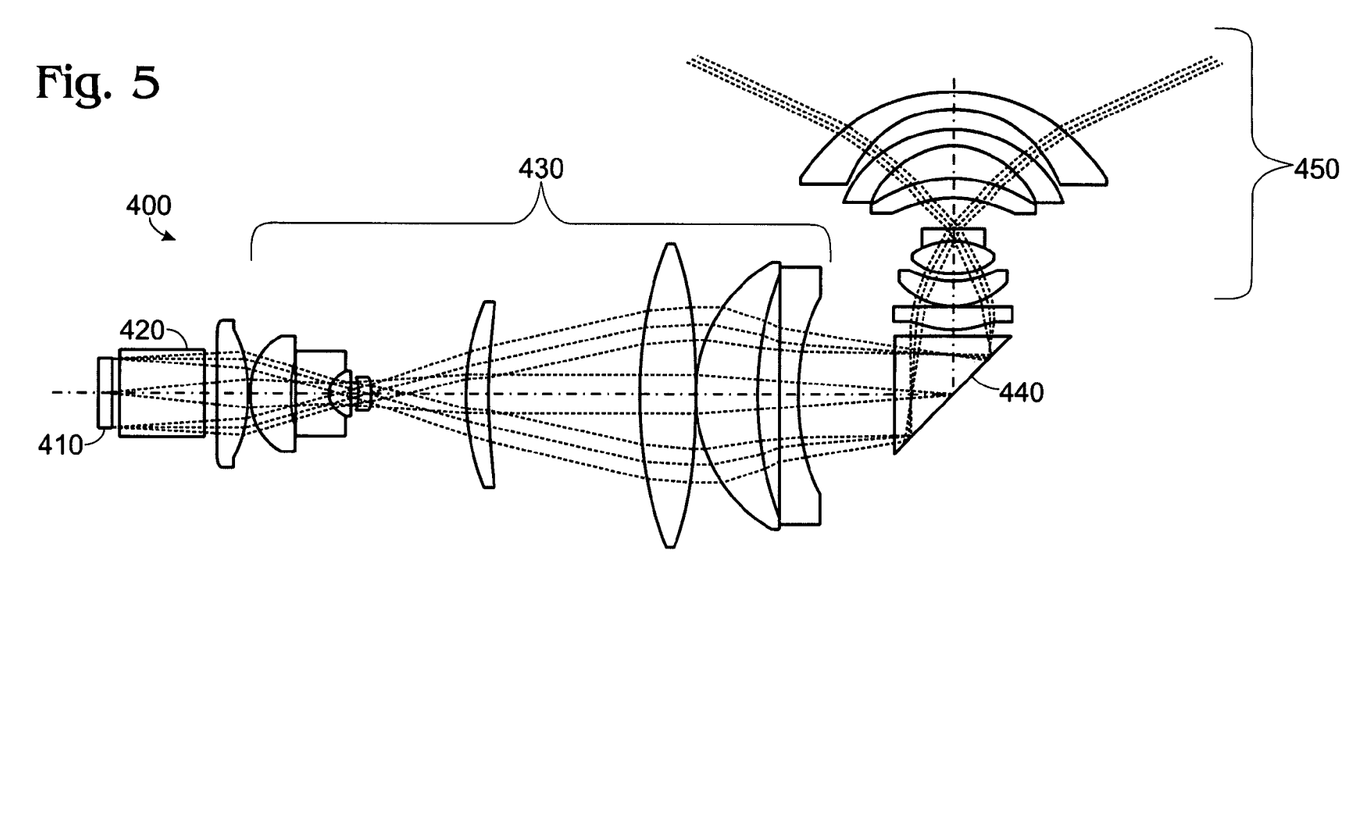
FIG. 5 is a schematic illustration of a lens system that may be used in the display devices illustrated above according to an embodiment of the present disclosure.

FIG. 5 illustrates one exemplary embodiment of a wide angle system described above. As illustrated, the system may include a DMD 410 adapted to provide an image to the lens system. An image can be provided to DMD 410 in any suitable manner. DMD 410 may be configured to selectively reflect light from any suitable light source (not shown) to the lens system. Other types of devices (e.g., microelectromechanical systems (MEMS), grating light valve (GLV), liquid crystal display (LCD), liquid crystal on silicon (LCOS)) may be used to provide an image to the lens system.

Although other devices may be used to provide an image to the lens system, in the illustrated embodiment, prism 420 directs the image to relay lens group 430. Relay lens group 430 projects the image from prism 420 to prism 440 and distorts the image such that intermediate prism 440 receives an intentionally distorted intermediate image.

In one embodiment, relay lens group 430 includes 9 lenses; however, any number of lenses can be used, based on, for example, the desired distortion of the intermediate image, or the overall size of the lens system. The distortion to be caused by relay lens group 430 may be equal and opposite the distortion caused by wide angle lens group 450. In one embodiment, the intermediate image is approximately a half circle image in a warped image plane. In alternate embodiments, other types of distortion may be used. For example, if the full lens field is to be used, the distorted intermediate image could be a generally circular image. The image plane may or may not be warped.

Intermediate prism 440 may provide a 90° fold of the image path. As described below with respect to FIG. 5, the fold is not required. Alternatively, other fold angles, for example, 45°, 30°, 135°, 180°, etc. could be used. Moreover, multiple folds may be used. Wide angle lens group 450 projects the distorted intermediate image to a screen for display. Because wide angle lens group 450 causes distortion to the image to be projected and the intermediate image has been pre-distorted by relay lens group 430, the resulting image projected by the lens system has little or no distortion. In one embodiment, the total distortion caused by relay lens group 430, wide angle lens group 450 and any associated prisms may be less than 3%.

In some embodiments, the optic axes of the lenses of relay lens group 430 may be aligned. Similarly, the optic axes of the lenses of wide angle lens group 450 also may be aligned. Typically, wide angle lens group provides a field angle of greater than 100°. In one embodiment, the field angle is 153°; however, any other angle can be provided. In some embodiments, the optical axis of wide angle lens group 450 is perpendicular to the screen so that keystone, or trapezoidal distortion is absent.

Figure 6:
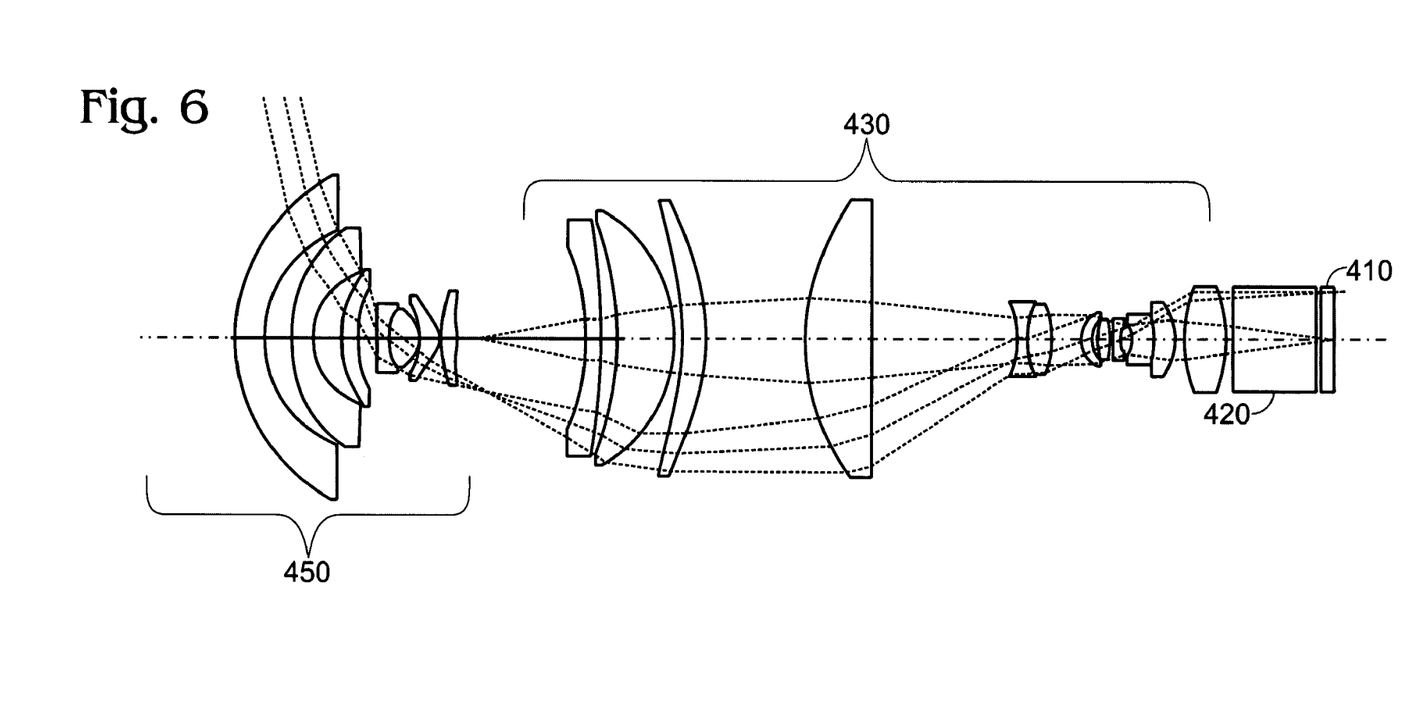
FIG. 6 is a schematic illustration of another lens system that may be used in the display devices illustrated above according to an embodiment of the present disclosure.

FIG. 6 illustrates another embodiment of a wide angle lens system having a distorted intermediate image. The lens system of FIG. 6 is similar to the lens system of FIG. 5 except that the lens system of FIG. 6 is not folded. That is, wide angle lens system 450 is co-axial with relay lens system 430. The lens system of FIG. 6 may not include an intermediate prism. An intermediate prism can be included, if desired.

As described above, the image may be projected to a screen. In some embodiments, the screen may be a combination screen. The following description of the combination screen is provided in relation to use in a rear projection system, such as the rear projection system shown and described in FIGS. 3 and 3A. However, it is possible that a combination screen, or similar screen, may be implemented in other devices, such as the front projection systems described above.

In the combination screen, the function of a Fresnel lens and a lenticular light diffuser are combined into one screen. In other words, a core of the screen is physically continuous as opposed to being constructed from two physically distinct layers that are laminated together. The combination greatly reduces the risk that the Fresnel lens and the lenticular light diffuser may become physically separated, which could result in unwanted image aberrations and light leaks. The function of the Fresnel lens includes redirecting the light normal to the surface of the screen, while the function of the lenticular light diffuser includes distributing the light so that a plurality of viewing positions are available. Further, the lenticular light diffuser (and/or the Fresnel lens) may aid in reducing reflection of the ambient light from outside the display device, e.g. a television. By combining these functions into a single screen (or integrated screen), it is possible to improve image display on the screen.

Figure 7:
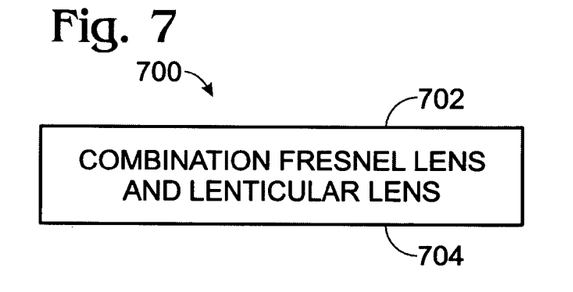
FIG. 7 schematically shows a combination screen including both Fresnel lens features and lenticular lens features.

For example, FIG. 7 schematically shows a combination screen 700. Combination screen 700 includes a lens surface 702 which has the functions of both a light redirector (e.g., Fresnel lens) and a light diffuser (e.g., lenticular screen). For example, lens surface 702 may include both Fresnel lens features and lenticular screen features. A back surface 704, such as a black mask, may be provided to absorb ambient light. Spaces may be provided on the back surface 704 to allow desired light to pass through the screen.

As briefly described above, the combination screen may be configured to absorb ambient light. For example, the combination screen may include a black mask to absorb ambient light. The mask may include clear apertures caused by an exposure process involving shining light through the lenticular lens structures to turn the black mask clear where light from the projector should pass through. From the projector side, all the light is focused through the slits. From the viewer side, ambient light is not focused and mainly a black mask is visible.

In contrast to the combination screen, use of two independent sheets, a Fresnel lens sheet and a light diffuser sheet, may be used as the screen. However, if these two physically distinct sheets became separated (such as in the center) the light may spread out causing flair or blooming around the pixel. Additionally, ghost light reflections may become visible primarily from off-axis viewing positions. It is difficult to bond the sheets together to prevent them from separating because the input side of the light diffuser sheet benefits from the air-plastic interface in performing its optical task.

Referring again to the combination screen, the function of the Fresnel lens (redirection of light normal to the surface of the screen) and the function of the lenticular light diffuser (distribution of light and reduction of reflection of ambient light) may be combined into one integrated screen. Since the combination screen is a single screen, there will be no separation of sheets, thus avoiding the image aberrations caused by separation of the Fresnel sheet from the lenticular light diffuser sheet.

In an exemplary combination, a mathematical function of the Fresnel lens may be added to a function of the lenticular light diffuser lens to form desired integrated screen features (e.g., structures or elements). Thus, the lenticular light diffuser function may be added with the Fresnel lens function.

Figure 7A:
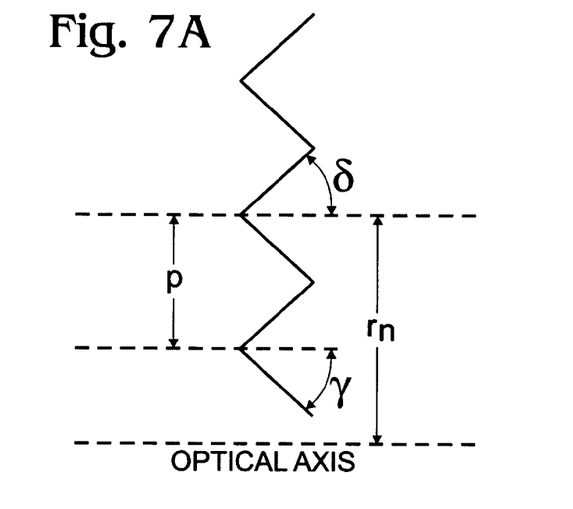
FIG. 7A schematically shows a Fresnel lens arrangement.

For example, and not as a limitation, the Fresnel lens surface may be described as follows:

$$F(R) = \begin{cases} \frac{-(R-r_n)}{\tan(\gamma)} \Big|_{R=r_n}^{R=\frac{p*\tan(\gamma)}{\tan(\delta)+\tan(\gamma)}} \\ \frac{-(p-(R-r_n))}{\tan(\delta)} \Big|_{R=\frac{p*\tan(\gamma)}{\tan(\delta)+\tan(\gamma)}}^{R=p} \end{cases}$$

where $F(R)$ is the "sag" of the surface or position above some reference plane, R is the radius from the optical axis, $r_n$ is the radius from the optic axis of a given groove, p is the groove pitch of the Fresnel, $\gamma$ is the angle of the face of the groove (the one towards the Fresnel center), and $\delta$ is the angle of the opposite face of the groove (the one away from the Fresnel center), as schematically shown in FIG. 7A. Such a function can be referred to as a Fresnel function.

Figure 7B:
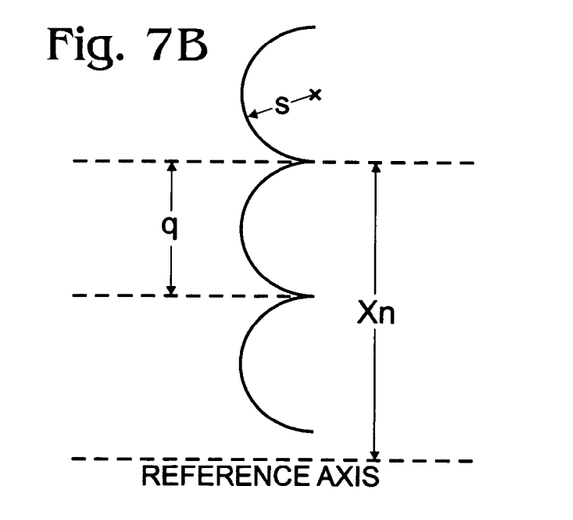
FIG. 7B schematically shows a lenticular lens arrangement.

The lenticular screen may be described as follows:

$$G(x) = s + \sqrt{s^2 - ((x_n + q/2) - x)^2}$$

where $G(x)$ is the sag of the lenticular surface, xn is the distance to the edge of one lenticular lens, s is the radius of curvature of the lenticular lens, and q is the pitch of the lenticular lenses, as schematically shown in FIG. 7B. Such a function can be described as a diffusion function.

For the combination screen, the sag at any point on the screen may be calculated by the addition of these two functions; sag=$F(R)+G(x)$. The defined edges of the Fresnel grooves and lenticular lenses form boxes or "elements" where the equation is valid, i.e. for a given $x_n$ and $r_n$.

It should be appreciated that the above equations for the Fresnel lens and/or lenticular screen are provided as examples. Other suitable equations may be provided for the Fresnel lens and/or lenticular screen without departing from the scope of the invention. The above equations, or other equations, can be modified to correct for any unwanted aberrations.

The elements of the combination screen may be further modified by perturbing the surface of the screen to focus the light into a well-defined point or line on the black mask described above. The result may be that exposure creates a small and well-defined hole in the black mask. The small hole area to black mask area results in improved ambient light reduction.

For example, a combination screen may be provided with a lens surface and a back surface. The lens surface may be a combination Fresnel lens and lenticular screen. The back surface may be a reflective/non-reflective surface, with portions of the surface being reflective and other portions of the surface being non-reflective.

For example, the back surface may include a black mat or mask. In some embodiments, the back surface may include appropriately sized and positioned reflecting spaces on the black mask. The remaining black spaces (the non-reflecting spaces) may be considered black absorber or absorbing spaces.

The black mask may be a black film or other suitable film that produces or reflects comparatively little light. Thus, the black mask may be configured to absorb a substantial portion of visible light. In some embodiments, the mask may be substantially non-reflective. It should be appreciated that the mask may include a coating, a surface treatment, a layer, a covering, a sheet, etc. In some embodiments, black photo film or the like may be used as the mask.

For example, white spaces may be created in the black mat and perform as reflecting spaces. For example, the mat may be photosensitive such that white spaces are "burned' into a black mat. The spaces may be configured to correlate to the size and type of lens provided on the lens surface. Light passing through lens surface directed from the projection device may be projected back towards a viewer from reflecting spaces. Ambient light and other stray light striking the absorbing spaces may be absorbed. Since there is a higher percentage of absorbing space to the reflective space, a substantial amount of the ambient light may be absorbed, thus resulting in reduced ambient light reflection and increasing contrast in the image.

The combination screen described above may result in a reduction of cost compared to the two-piece configuration of a Fresnel sheet and a lenticular lens sheet. Further, in contrast to the two sheets where separation may result in loss of image quality, such as due to focus aberrations and/or ghosting, the single screen may prevent such image quality reductions.

Additionally, the combination screen may be of reduced size compared to the two-piece configuration. The reduction in size further may reduce stray light as the stray light will have less distance to travel internal to the screen before exiting. For example, blooming may be reduced as stray light will be more regionalized to the desired location.

Further improvements will modify each of these "elements" by perturbing the surface to focus the light into a well defined point or line on the black mask. This will cause the hole in the black mask (due to the exposure process) to be well defined and small. In turn, this will have the smallest hole area to black mask area for best ambient light reduction.

Thus, in some embodiments, a combination screen for a display device comprising a screen having a plurality of elements defined by the edge of a Fresnel groove and a lenticular lens is provided. The combination screen may be provided in a rear projection display. Further, a black mask may be provided to absorb ambient light.

In some embodiments, a combination screen for a display device comprising a sag defined as a sag of a lenticular surface added to the sag of the Fresnel lens surface is provided. The combination screen may be provided in a rear projection display. Further, a black mask may be provided to absorb ambient light.

In some embodiments, a combination screen including a Fresnel lens surface and a lenticular surface is integrated into a single sheet. The combination screen may be provided in a rear projection display. Further, a black mask may be provided to absorb ambient light.

Figure 8:
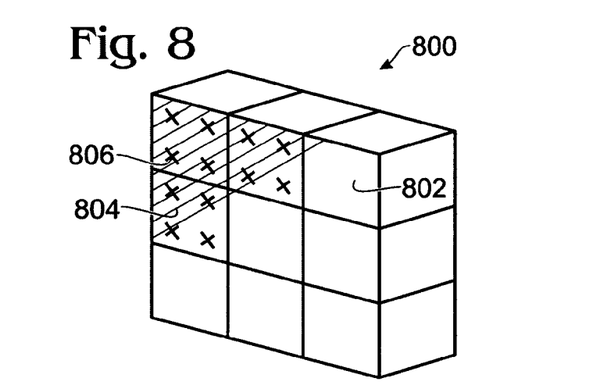
FIG. 8 schematically shows combination screen features according to an embodiment of the present disclosure.

FIG. 8 schematically shows screen features of a screen 800. Screen 800 can be descriptively divided into sections 802 that may include unit cells or pixels including various screen features. Each section 802 may include a Fresnel element 804 and/or a lenticular element 806, for example. Further, each section 802 may be of various geometries. In particular, the sections may exhibit square or hexagonal packaging, or virtually any other suitably shaped packaging.

It should be noted that in some embodiments, only selected portions of the screen may be a combination screen, while in other embodiments, the entire screen may be a combination screen.

Figure 9:
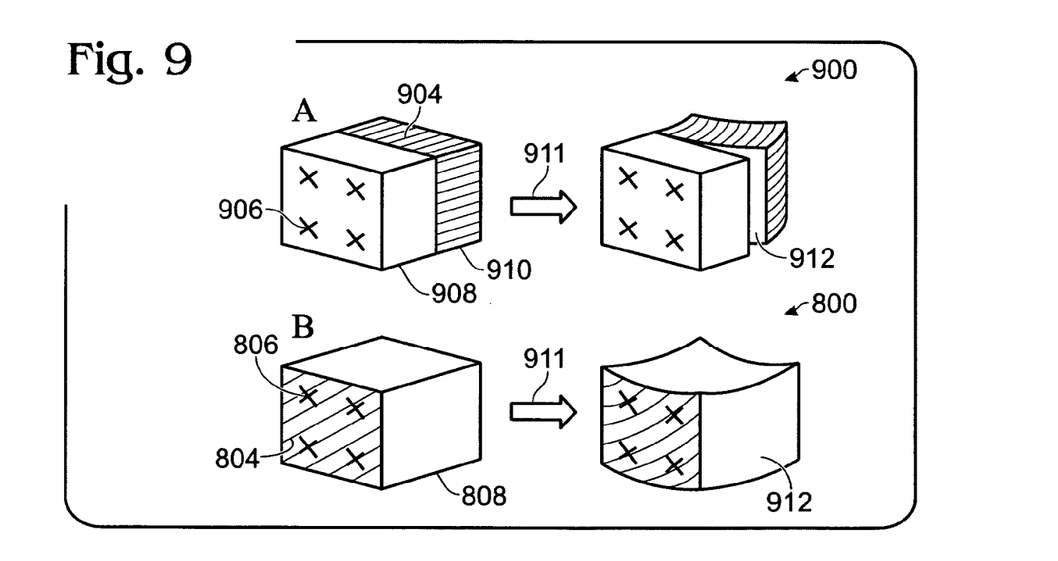
FIG. 9 schematically shows separation of a screen assembly including a Fresnel layer and a lenticular layer relative to a combination screen including integrated Fresnel and lenticular features.

Instead of a combination screen as shown in FIG. 8, the use of two independent sheets, a Fresnel lens sheet and a lenticular lens sheet, may be used as a screen. FIG. 9 illustrates at A, potential issues that may be faced with a screen 900 using two independent sheets, a Fresnel lens sheet 910 layered with a lenticular lens sheet 908. In this example, the Fresnel element 904 and the lenticular element 906 are sequentially arranged on adjacent screens. The screen 900 may be subject to an environmental strain, schematically represented by arrow 911, such as humidity or warping, for example. The screen 900 may suffer rearrangement, such as delamination, as shown at 912, or realignment that may result in undesired image distortion.

FIG. 9 illustrates at B, a combination screen at least partially circumventing some of the issues encountered by a screen that uses two independent sheets. Screen 800 includes a Fresnel element 804 and a lenticular element 806 developed on the same screen surface. As such, the screen 800 includes a unitized edge 808 as opposed to the layered structure of screen 900. Combination screen 800 may also be subject to an environmental strain, schematically represented by arrow 911, such as humidity or warping. However, because lenticular element 806 is integrated with Fresnel element 804, the same positional shifting and/or undesired image distortion can be minimized or even eliminated altogether.

Figure 10A:
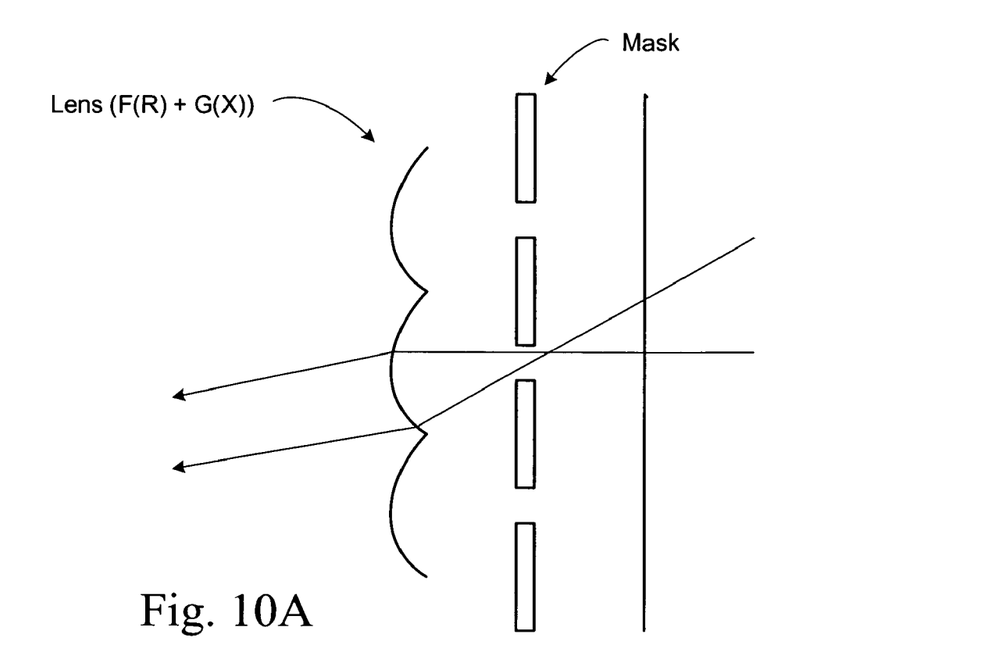
FIGS. 10A and 10B schematically show a combination screen and a cooperative mask.
Figure 10B:
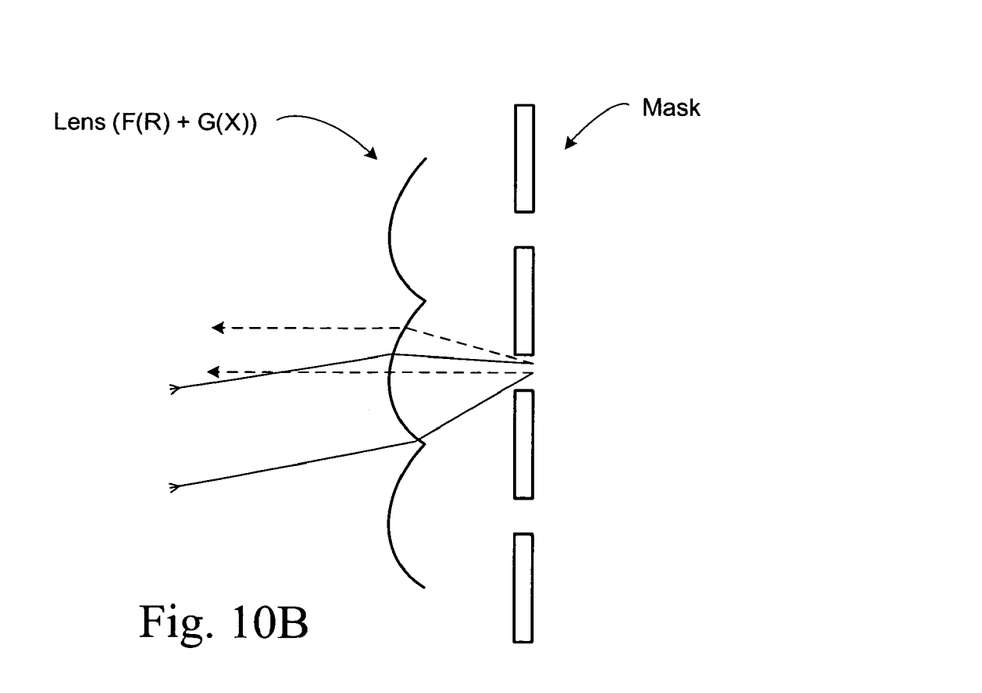

Screens in accordance with the present disclosure can optionally be made by exposing light through one surface that includes light diffusion and light redirection features, thus creating holes in a black surface on the opposite side of the screen. In the case of a rear projection screen, a clear substrate can then be laminated to the surface that has the black mask with the holes. This is schematically shown in FIG. 10A. In the case of front projection screen, a reflective or white substrate can then be laminated to the surface that has the black mask with the holes. This is schematically shown in FIG. 10B. This is a nonlimiting method of manufacturing a combination screen that provides good contrast in ambient light.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein.

Inventions embodied in various combinations and subcombinations of features, functions, elements, and/or properties may be claimed in a related application. Such claims, whether they are directed to a different invention or directed to the same invention, whether different, broader, narrower or equal in scope to any original claims, are also regarded as included within the subject matter of the inventions of the present disclosure.

The invention claimed is:

1. A screen, comprising:
   a perimeter;
   a back surface interior the perimeter; and
   a viewing surface interior the perimeter and opposite the back surface,
   wherein at least one of the viewing surface or the back surface is characterized by a topography including both light redirection features and light diffusion features and wherein at least a thickness of the screen between the back surface and the viewing surface varies according to both a light redirection function and a light diffusion function.

2. The screen of claim 1, further comprising a continuous core at least partially defined by the perimeter, back surface, and viewing surface.

3. The screen of claim 2, wherein the perimeter, back surface, viewing surface, and core are collectively configured to provide both light redirection functionality and light diffusion functionality.

4. The screen of claim 1, wherein the viewing surface is configured to receive projected light and the screen is configured to reflect the projected light for viewing.

5. The screen of claim 4, wherein the back surface is configured with light reflecting portions and light absorbing portions, the light reflecting portions being configured to substantially reflect light transmitted from the viewing surface, the light absorbing portions being configured to substantially absorb environmental light.

6. The screen of claim 4, wherein the viewing surface is configured with light reflecting portions and light absorbing portions, the light reflecting portions being configured to substantially reflect light transmitted from the viewing surface, the light absorbing portions being configured to substantially absorb environmental light.

7. The screen of claim 1, wherein the back surface is configured to receive projected light and at least one of the viewing surface or the back surface is configured to transmit the projected light for viewing.

8. The screen of claim 7, wherein at least one of the back surface or the viewing surface includes both light transmitting portions and light absorbing portions, the light transmitting portions being configured to substantially transmit light received by the back surface, the light absorbing portions being configured to substantially absorb environmental light.

9. The screen of claim 1, wherein the light redirection function is:

$$F(R) = \begin{cases} \frac{-(R-r_n)}{\tan(\gamma)} & \big|_{R=r_n}^{R=\frac{p*\tan(\gamma)}{\tan(\delta)+\tan(\gamma)}} \\ \frac{-(p-(R-r_n))}{\tan(\delta)} & \big|_{R=p}^{R=\frac{p*\tan(\gamma)}{\tan(\delta)+\tan(\gamma)}} \end{cases},$$

wherein R is a radius from an optical axis, $r_n$ is a radius from the optic axis of a given groove, p is a groove pitch, $\gamma$ is a first face groove angle, and $\delta$ is an opposite face groove angle; and the light diffusion function is:

$$G(x) = s + \sqrt{s^2 - ((x_n + q/2) - x)^2},$$

wherein, $x_n$ is an edge distance, s is a radius of curvature, and q is a pitch.

10. A screen, comprising:
    a perimeter;
    a back surface interior the perimeter;
    a viewing surface interior the perimeter and opposite the back surface; and
    a continuous core at least partially defined by the perimeter, back surface, and viewing surface,
    wherein the perimeter, back surface, viewing surface, and core are collectively configured to provide both light redirection functionality and light diffusion functionality, and wherein at least a thickness of the screen between the back surface and the viewing surface varies according to both a light redirection function and a light diffusion function.

11. The screen of claim 10, wherein at least one of the viewing surface or the back surface is characterized by a topography including both light redirection features and light diffusion features.

12. The screen of claim 10, wherein the viewing surface is configured to receive projected light and the screen is configured to reflect the projected light for viewing.

13. The screen of claim 12, wherein the back surface is configured with light reflecting portions and light absorbing portions, the light reflecting portions being configured to substantially reflect light transmitted from the viewing surface, the light absorbing portions being configured to substantially absorb environmental light.

14. The screen of claim 12, wherein the viewing surface is configured with light reflecting portions and light absorbing portions, the light reflecting portions being configured to substantially reflect light transmitted from the viewing surface, the light absorbing portions being configured to substantially absorb environmental light.

15. The screen of claim 10, wherein the back surface is configured to receive projected light and at least one of the viewing surface or the back surface is configured to transmit the projected light for viewing.

16. The screen of claim 15, wherein at least one of the back surface or the viewing surface includes both light transmitting portions and light absorbing portions, the light transmitting portions being configured to substantially transmit light received by the back surface, the light absorbing portions being configured to substantially absorb environmental light.

17. The screen of claim 10, wherein the light redirection function is:

$$F(R) = \begin{cases} \frac{-(R-r_n)}{\tan(\gamma)} & \big|_{R=r_n}^{R=\frac{p*\tan(\gamma)}{\tan(\delta)+\tan(\gamma)}} \\ \frac{-(p-(R-r_n))}{\tan(\delta)} & \big|_{R=p}^{R=\frac{p*\tan(\gamma)}{\tan(\delta)+\tan(\gamma)}} \end{cases},$$

wherein R is a radius from an optical axis, $r_n$ is a radius from the optic axis of a given groove, p is a groove pitch, $\gamma$ is a first face groove angle, and $\delta$ is an opposite face groove angle; and the light diffusion function is:

$$G(x) = s + \sqrt{s^2 - ((x_n + q/2) - x)^2},$$

wherein, $x_n$ is an edge distance, s is a radius of curvature, and q is a pitch.

18. A screen, comprising:
    a perimeter;
    a back surface interior the perimeter; and
    a viewing surface interior the perimeter and opposite the back surface,
    wherein at least a thickness of the screen between the back surface and the viewing surface varies according to both a light redirection function and a light diffusion function, and wherein the light redirection function is:

$$F(R) = \begin{Bmatrix} \frac{-(R-r_n)}{\tan(\gamma)} \Big|_{R=r_n}^{R=\frac{p*\tan(\gamma)}{\tan(\delta)+\tan(\gamma)}} \\ \frac{-(p-(R-r_n))}{\tan(\delta)} \Big|_{R=\frac{p*\tan(\gamma)}{\tan(\delta)+\tan(\gamma)}}^{R=p} \end{Bmatrix},$$

wherein R is a radius from an optical axis, $r_n$ is a radius from the optic axis of a given groove, p is a groove pitch, γ is a first face groove angle, and δ is an opposite face groove angle; and the light diffusion function is:

$$G(x) = s + \sqrt{s^2 - ((_n + q/2) - x)^2},$$

wherein, $x_n$ is an edge distance, s is a radius of curvature, and q is a pitch.

19. The screen of claim 18, wherein at least one of the viewing surface or the back surface is characterized by a topography including both light redirection features and light diffusion features.

20. The screen of claim 18, further comprising a continuous core at least partially defined by the perimeter, back surface, and viewing surface.

21. The screen of claim 20, wherein the perimeter, back surface, viewing surface, and core are collectively configured to provide both light redirection functionality and light diffusion functionality.

22. The screen of claim 18, wherein the viewing surface is configured to receive projected light and the screen is configured to reflect the projected light for viewing.

23. The screen of claim 22, wherein the back surface is configured with light reflecting portions and light absorbing portions, the light reflecting portions being configured to substantially reflect light transmitted from the viewing surface, the light absorbing portions being configured to substantially absorb environmental light.

24. The screen of claim 22, wherein the viewing surface is configured with light reflecting portions and light absorbing portions, the light reflecting portions being configured to substantially reflect light transmitted from the viewing surface, the light absorbing portions being configured to substantially absorb environmental light.

25. The screen of claim 18, wherein the back surface is configured to receive projected light and at least one of the viewing surface or the back surface is configured to transmit the projected light for viewing.

26. The screen of claim 25, wherein at least one of the back surface or the viewing surface includes both light transmitting portions and light absorbing portions, the light transmitting portions being configured to substantially transmit light received by the back surface, the light absorbing portions being configured to substantially absorb environmental light.

* * * * *